G. P. BURRIS.
MEAT TENDERER.
APPLICATION FILED DEC. 14, 1914.
1,149,336.
Patented Aug. 10, 1915.
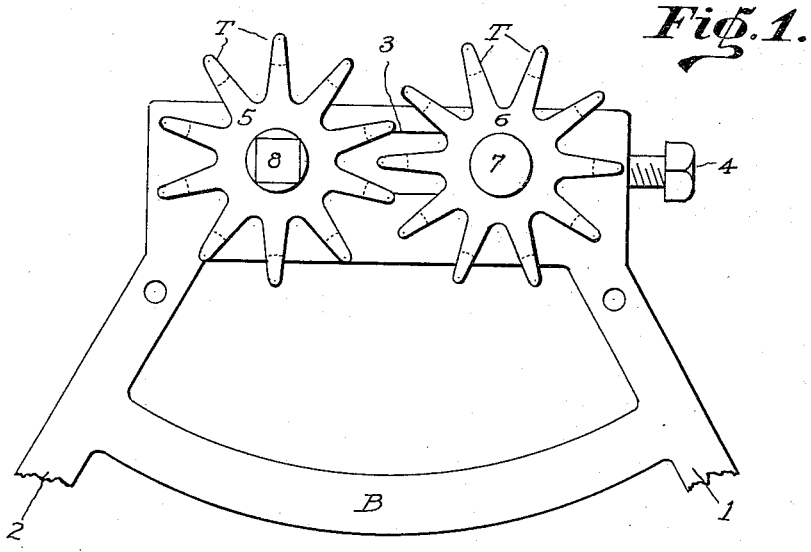
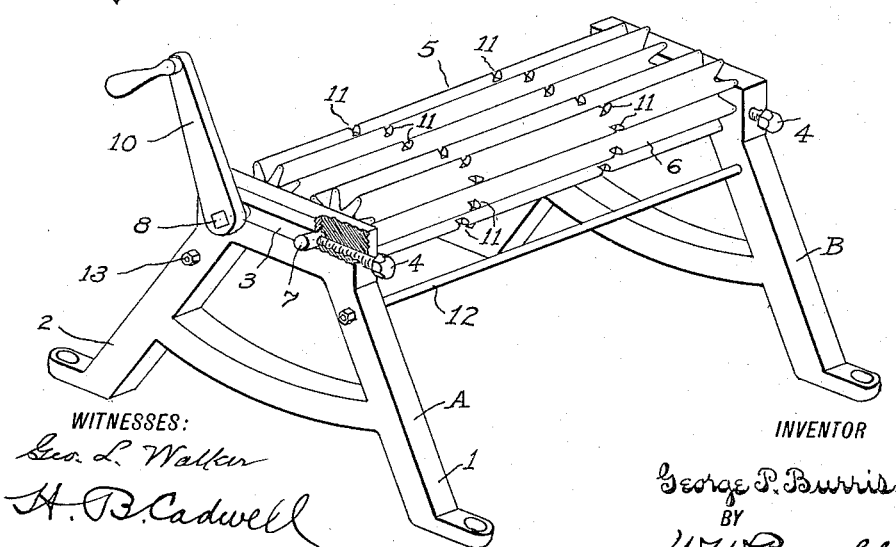

UNITED STATES PATENT OFFICE.

GEORGE P. BURRIS, OF PUEBLO, COLORADO.

MEAT-TENDERER.

1,149,336. Specification of Letters Patent. Patented Aug. 10, 1915.

Application filed December 14, 1914. Serial No. 877,038.

*To all whom it may concern:*

Be it known that I, GEORGE P. BURRIS, a citizen of the United States, and a resident of Pueblo, in the county of Pueblo and State of Colorado, have invented a certain new and useful Improvement in Meat-Tenderers, of which the following is a full, clear, and exact description.

My invention is an improvement in meat tenderers and my object is the provision of a simple, cheap, and efficient device for breaking down the tissues of tough meat to render such meat easily masticable.

The invention has the further objects of so constructing the machine that certain strips through the meat will not have their tissues broken, in order to provide portions adapted to hold the cut in its original shape in case the remaining portions should be substantially severed into sections; and also to so design the machine that substantially all its parts may be easily, cheaply and simply made by casting, thus materially decreasing its cost.

In the single sheet of drawings accompanying this application and forming a part hereof Figure 1 is an end view of the pair of ribbed rolls which form the working portion of my device, the nearer of the supporting frame sections being removed to fully disclose the rolls and the upper part of the farther section appearing to show the relation of the rolls to the frame standards; and Fig. 2 is a perspective of the entire device, a portion of one of the standards being broken away to show the means for adjusting the space between the rolls.

The supporting frame comprises a pair of similar standards A, B, provided with legs 1, 2, for securing the device to a table or other support. Each standard has a slot 3 therein for the reception of journals on the ends of the rollers and each is provided with a bolt 4 threaded in one end of the slot and adapted to be adjusted in or out to vary the amount of spread allowed between the rolls.

In the preferred embodiment of my invention shown in the drawings the rolls 5, 6, are exactly alike for the sake of simplicity of construction, each having a short journal 7 at one end and a longer journal 8 at the other, the latter being squared to form a mounting for a crank 10, only one crank of course being employed.

The rolls 5, 6, are, as shown in the drawings, each provided with blunt ribs T, which, in the preferred adjustment of the rolls, are allowed to intermesh to some degree. The ribs are also notched at 11, all the notches on a roll being in the same vertical plane and the planes being so disposed as to coincide when the rolls are placed in the machine. These notches are for the purpose of leaving a portion of the tissue of the meat intact in order to assure that the meat treated will retain its original form so that, for instance, if a steak has been treated it will still be in suitable form to serve.

When it is desired to render a piece of meat tender the distance between the rolls is adjusted by means of the set screws 4 to suit the thickness of the meat and the meat is run through the rolls, the juices which are squeezed out being caught in a platter below and reabsorbed by the meat when it falls on the platter. If passing the meat through in one direction is thought insufficient it may be turned at right angles and passed through again—which will result in a thorough breaking down of the tissues in the toughest cuts, the notches 11, however, leaving the meat with sufficient unimpaired tissue to hold it together.

It will be evident from the above that my device is capable of being very readily made by casting—the standards and rolls being duplicates and therefore requiring only a single pattern each—and that it may be assembled by simply placing the journals of the rolls in the slots 3 and securing the standards together by a pair of spacing rods 12, 13, held in place by nuts. All the parts being open and the ribs of the rolls extending above the tops of the standards, it is also exceptionally easy of cleaning.

Having thus described my invention what I claim and desire to secure by Letters Patent is:

1. In a meat tenderer, a frame, and a pair of ribbed rolls journaled therein in coöperative relation, the ribs of each of said rolls being notched in the same plane transverse to their axes.

2. In a meat tenderer, a frame, and a pair of ribbed rolls journaled therein in coöperative relation, the ribs of each of said rolls being notched in a plurality of coinciding vertical planes transverse to their axes, and means for rotating said rolls.

In testimony whereof, I hereunto affix my signature in the presence of two witnesses.

GEORGE P. BURRIS.

Witnesses:
A. L. WRIGHT,
GEO. L. WALKER.